Oct. 18, 1932.                E. K. BAKER                 1,883,748
                         TIE ROD END CONNECTION.
                          Filed June 26, 1930
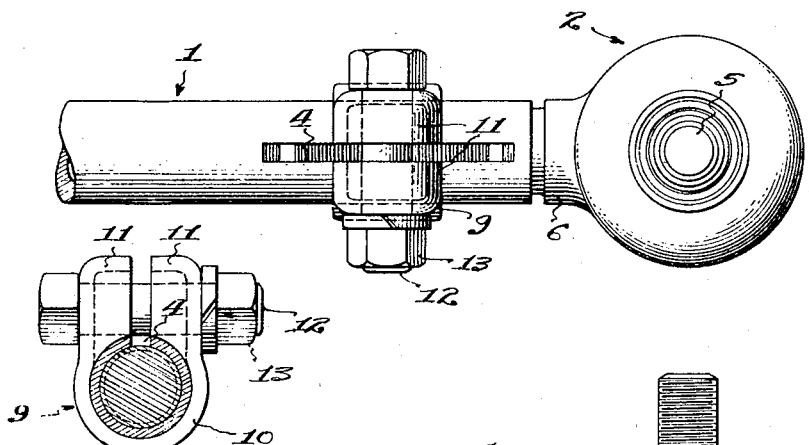
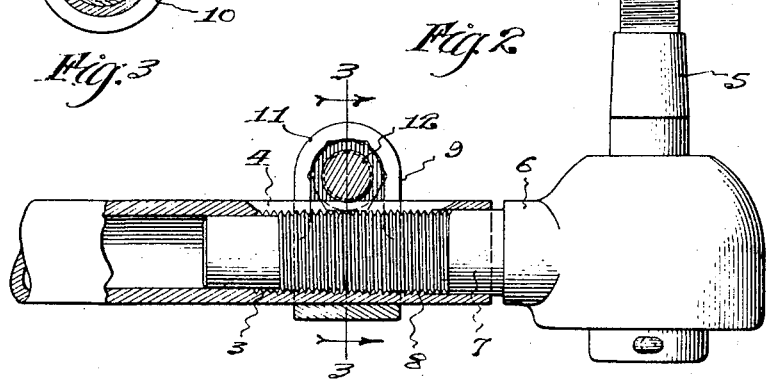
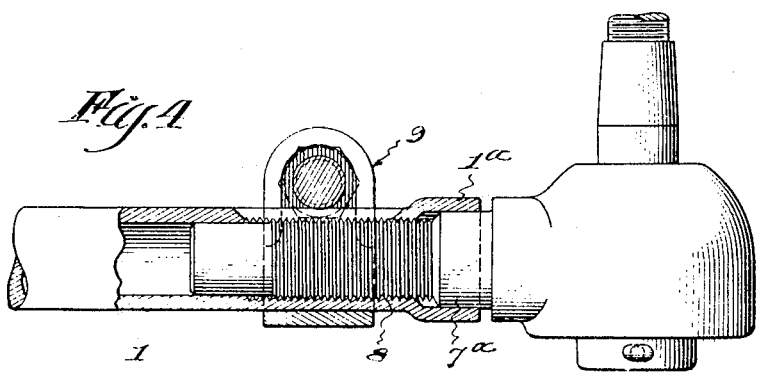

Patented Oct. 18, 1932

1,883,748

UNITED STATES PATENT OFFICE

ERLE K. BAKER, OF CHICAGO, ILLINOIS

TIE ROD END CONNECTION       REISSUED

Application filed June 26, 1930. Serial No. 463,921.

This invention relates to improvements in tie rod end connections and it consists of the matters hereinafter described and more particularly pointed out in the appended claims.

The primary object of the invention is to provide a simple and efficient structure whereby the end of a rod is provided with means for connection to an associated arm or member.

Another object of the invention is to provide a structure of this kind especially adapted for use as the tie rod for automobiles whereby the ends of the same are provided with means for connection with the associated steering knuckle arms.

A further object of the invention is to provide a connection of this kind, which costs less to make when labor and material is considered and which though lighter in weight than the connections now used, has greater strength to resist fracture and breakage.

These objects of the invention as well as others together with the many advantages thereof will more fully appear as I proceed with my specification.

In the drawing:—

Fig. 1 is a top plan view of a rod end connection embodying the preferred form of the invention.

Fig. 2 is a view in side elevation of the same with parts shown as broken away to more clearly disclose the construction thereof.

Fig. 3 is a transverse vertical sectional view through the same as taken on the line 3—3 of Fig. 2.

Fig. 4 is a view similar to Fig. 1 and illustrates a slightly modified form of construction.

Referring now in detail to that embodiment of the invention illustrated in Figs. 1 to 3 inclusive of the accompanying drawing, 1 indicates as a whole one end of a tie rod of an automobile and 2 indicates a head whereby said rod end may be operatively connected to an associated steering knuckle arm, not shown. Preferably the rod is made from a length of tubing although a solid rod construction with tubular ends is well adapted for the purpose.

Heretofore in such tie rod connections the ends of the rod were exteriorly threaded to receive a longitudinally split, interiorly threaded extension on the head, which head and extension were usually made from a forging, the extension having pairs of integral ears to receive the clamping bolts to secure the parts in adjusted relation. Such a structure had inherent objections. As the extension enclosed the rod end, it is apparent that more metal was required therein and a part of this was wasted in drilling the same to receive the rod end. Again the rod end was externally threaded and a bending strain would start a fracture in the V-groove of the thread at the end of the extension.

In my improved construction the end of the tubing is interiorly threaded as at 3 and I also provide a longitudinal slot 4 therein that terminates short of the extremity thereof as best shown in Fig. 2.

The head 2 which is furnished with a stud 5 for connection to the desired associated part such as a knuckle arm (not shown) includes a boss 6 at one side together with a lateral extension or stud 7 of desired length. Said boss is exteriorly screw threaded as at 8 for engagement with the interior threads 3 of the tubular rod end and the end of the stud near the boss is left exteriorly smooth to fit in the smooth interior extremity of the rod end.

Before the extension or stud 7 is threaded into the rod end, I slip on said end, a split clamp 9 that includes an annular body or band 10 and laterally spaced ears 11—11. Preferably and as herein shown the clamp is formed from sheet metal. The said clamp substantially surrounds the tube end at a point midway of the slot 4 thereon and the space between the ears of the clamp is registered with said slot. Of course, a bolt 12 is associated with the ears of the clamp and a nut 13 is threaded on the end of the bolt.

After the extension or stud 7 of the head has been threaded into the rod end, the nut 13 is drawn up on the bolt to cause the clamp to tightly grip the tube upon the extension.

In Fig. 4 is illustrated a slightly modified form of construction wherein the extremity 1ª of the tubular end is radially expanded so that the interior diameter thereof is increased permitting of the use of an annular shoulder 7ª on the extension or stud to project into the same. This eliminates the necessity of machining the interior of the tube end as in Fig. 2 to receive the smooth unthreaded exterior portion of the extension 7 near the boss 6. In making up the structure shown in Fig. 4, it is advisable to first apply the clamp 9 thereto and then expand the extremity 1ª and thereafter provide the slot 4 therein.

The construction above described has many advantages in that not only is the connection reduced in weight but it may be produced at a lower cost and has a greater resistance toward fracturing because of the smooth exterior surface of the tube end.

While in describing the invention, I have referred in detail to the form, arrangement and construction of the various parts thereof the same is to be considered merely as illustrative so that I do not wish to be limited thereto except as may be specifically set forth in the appended claims.

I claim as my invention:—

1. In a tie rod end connection, the combination of a housing containing a stud adapted for a limited universal movement therein, said housing having an externally threaded shank integral therewith, a tie rod internally threaded and longitudinally split at the end and adapted to be adjustably connected to said shank, and a split clamping ring surrounding said end of the tie rod for clamping it upon said housing shank.

2. In tie rod end connections, the combination of a housing containing a stud adapted for a limited universal movement therein, said housing having an externally threaded shank disposed at an angle to the normal axis of the stud in said housing, a tie rod having an internally threaded end to receive said shank, said tie rod end so formed as to be radially contractible about said shank and a split ring surrounding said tie rod end for clamping said tie rod end upon said housing shank.

In testimony whereof, I have hereunto set my hand, this 25th day of June, 1930.

ERLE K. BAKER.